United States Patent [19]

Mary et al.

[11] Patent Number: 4,792,892
[45] Date of Patent: Dec. 20, 1988

[54] DATA PROCESSOR WITH LOOP CIRCUIT FOR DELAYING EXECUTION OF A PROGRAM LOOP CONTROL INSTRUCTION

[75] Inventors: Luc Mary, Bures sur Yvette; Bahman Barazesh, Paris, both of France

[73] Assignee: Telecommunications Radioelectriques et Telephoniques T.R.T., Paris, France

[21] Appl. No.: 48,481

[22] Filed: May 1, 1987

Related U.S. Application Data

[63] Continuation of Ser. No. 682,227, Dec. 17, 1984, abandoned.

[30] Foreign Application Priority Data

Dec. 30, 1983 [FR] France .............................. 83 21104

[51] Int. Cl.⁴ .............................................. G06F 9/40
[52] U.S. Cl. .............................................. 364/200
[58] Field of Search ... 364/200 MS File, 900 MS File

[56] References Cited

U.S. PATENT DOCUMENTS

| | | | |
|---|---|---|---|
| 3,593,306 | 7/1971 | Toy | 364/200 |
| 3,654,613 | 4/1972 | Dunne et al. | 364/900 |
| 3,736,567 | 5/1973 | Lotan et al. | 364/200 |
| 4,097,920 | 6/1978 | Ozga | 364/200 |
| 4,562,537 | 12/1985 | Barnett et al. | 364/200 |

OTHER PUBLICATIONS

I.B.M. Tech. Discl. Bull., vol. 14, No. 9, Feb. 1972, p. 2806.

Primary Examiner—Raulfe B. Zache
Assistant Examiner—Florin Munteanu
Attorney, Agent, or Firm—Thomas A. Briody; Jack E. Haken; Leroy Eason

[57] ABSTRACT

A data processor for executing a program of instructions stored in a program memory controlled by a program counter. To execute a loop control instruction, calling for repeated execution N times of a sequence of "i" instructions, the processor includes a loop circuit having an instruction counter which counts execution of the instructions in the loop sequence and produces an end-of-sequence signal upon each completion of the loop, a register which refreshes the program counter with the address of the first instruction in the loop in response to each end-of-sequence signal, and a loop counter which counts the number of completions of the loop and delivers a signal indicating the end of the loop portion of the entire program and enabling the program counter to continue on with the rest of the program. The delay in loop execution permits initializing of registers in the data processor so as to permit pipeline execution of the loop instruction.

7 Claims, 3 Drawing Sheets a b

1

DATA PROCESSOR WITH LOOP CIRCUIT FOR DELAYING EXECUTION OF A PROGRAM LOOP CONTROL INSTRUCTION

This is a continuation of application Ser. No. 682,227, filed Dec. 17, 1984, now abandoned.

BACKGROUND OF THE INVENTION

1. Field of the Invention

The invention relates to a processor for processing data on the basis of instructions obtained from a program memory to which is connected a program counter for providing read address codes, this processor being provided, for the purpose of performing a part of a program stated in a loop control instruction comprising the execution N times of a looped sequence of "i" instructions, with a loop circuit comprising a loop counter to count the number of executions and to deliver a signal indicating the end of a part of the program so as to pass on to the remainder of the program.

After the last instruction in the looped sequence the processor automatically chooses whether to execute the following instructions or to start the performance of a new looped sequence. This mechanism permits the rapid execution of program loops.

2. Description of the Prior Art

A loop control instruction is described in IBM Technical Disclosure Bulletin, Volume 14, No. 9, February 1972, p. 2806. This instruction is difficult to use for pipelining. Pipeline calculations are extremely critical; inter alia, the arguments and results have to be presented and read in accord with a very narrow configuration. It is consequently impossible to initialize certain argument registers, to execute a loop control instruction and to execute a looped sequence N times. In particular, these "synchronization problems" limit the application of loop instructions.

The invention aims to provide a loop instruction processor making it possible to use pipeline calculations in a program loop sequence.

SUMMARY OF THE INVENTION

A processor in accordance with the invention is characterized by the fact that the loop circuit incorporates a counter of instructions in the sequence to provide an end-of-sequence counter, a first register to recall in the program counter the address of the first instruction in the sequence at the end of each end-of-sequence signal and then, when the loop control signal is placed before a number "D" of instructions for the start of said part of the program, the loop circuit incorporates a time counter to count "D" instructions before triggering the execution of the sequence N times.

The shift "D" between the loop control instruction and the start of the looped sequence can be used to initialize the appropriate registers for the pipeline calculation.

Since calculation begins immediately after initialization, synchronization problems are avoided.

The following description read in conjunction with the attached drawings, the whole being given by way of non-exhaustive example, will facilitate understanding of how the invention can be embodied.

DESCRIPTION OF THE PREFERRED EMBODIMENT

Figure 1:
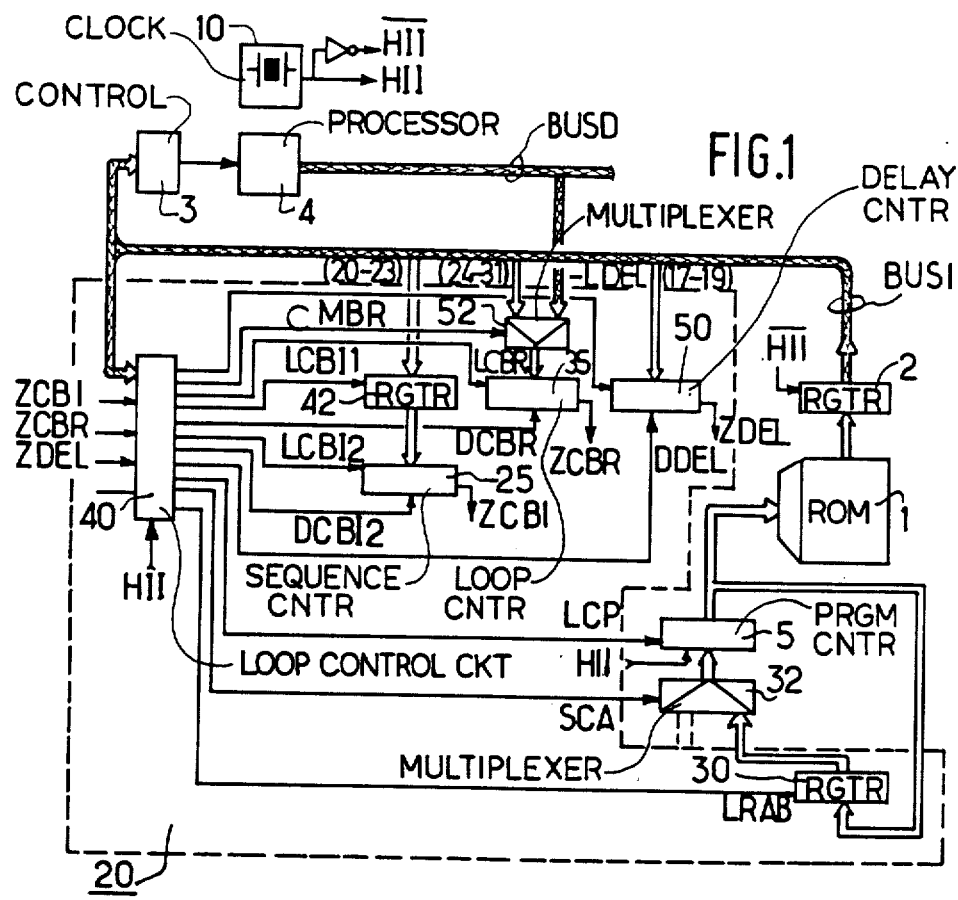
FIG. 1 shows a processor in accordance with the invention.

The processor shown in FIG. 1 comprises first of all a ROM 1 containing the entire operating program of the processor. The operation of the processor is defined by means of instructions which are derived from ROM 1 and which, before being transmitted over a line BUS1, pass through a register 2 called an instruction register. Via a control circuit 3 these instructions will control various operations of a group 4 of elements of the processor. These elements are, as is well known, random-access memories, arithmetic and logic units, working stores, wired multipliers, etc. The various instructions are located at different addresses in memory 1. The address codes for memory 1 are generated by a program counter 5. A clock circuit 10 produces the signals HII which cause the counter 5 to advance and thus regulate the frequency with which the instructions appear on the bus BUS1, register 2 being loaded upon signals $\overline{HII}$. Circuit 10 also provides other signals for controlling the entire operation of the processor.

Figure 2:
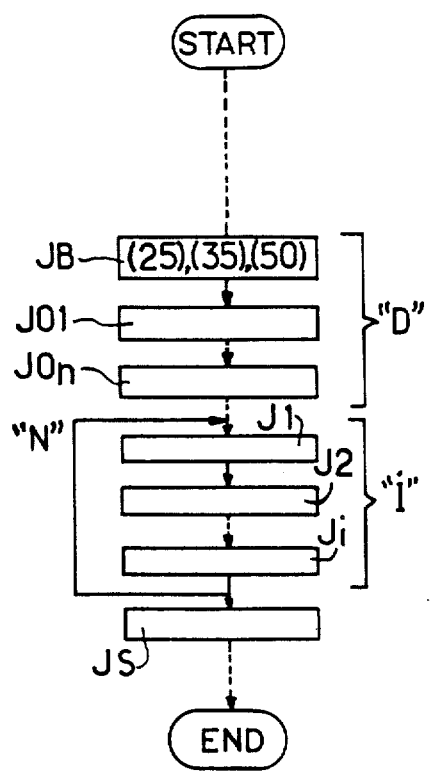
FIG. 2 shows schematically a flow chart incorporating a loop.

Shown in the form of a flow chart in FIG. 2 is an extract between start and end of the program contained in memory 1. Each rectangle in this flow chart represents an instruction. This extract shows a sequence of loop instruction J1, J2, . . . Ji which has to be executed N times before continuing to the next instruction JS. To that end the processor incorporates a loop circuit 20 comprising a sequence instruction counter 25 to deliver a signal ZCBI indicating each completion of the instruction sequence J1, J2, . . . Ji; this counter 25 advances in response to signals DCB12 with the same frequency as the progression signals HII delivered by the clock circuit 10. Circuit 20 also incorporates a first register 30 for containing the address of the first instruction J1 in the loop and to deliver it via a multiplexer 32 to the program counter 5 upon each appearance of the end-of-sequence signal ZCBI. A loop counter 35 is triggered at the start of the loop part of the program, advancing in response to signals DCBR so as to count the number of loop executions and producing a signal ZCBR indicating the end of the loop part of the program in order to pass on to the next instruction in the program. The signal ZCBI corresponds in this embodiment to the resetting to zero of the instruction counter 25, which advances in steps of " $-1$ " in response to clock signals DCBI2 delivered by a loop control circuit 40. To reload the instruction counter 25 at each start of a sequence a register 42 has been provided which is intended to contain the number "i" corresponding to the number of instructions which the sequence comprises. Similarly, the signal ZCBR is the signal for resetting to zero of the loop counter 35, advancing in steps of " $-1$ " starting from the value N in response to the signals DCBR generated by the circuit 40.

Figure 3:
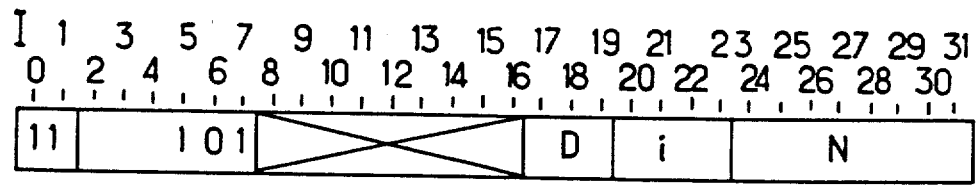
FIG. 3 shows the format of a looping command instruction.
Figure 3:

The loop register 42 and the counter 35 are loaded by means of a looping instruction JB whose structure is shown in FIG. 3. This instruction is made up of thirtytwo binary elements corresponding to the number of wires forming the bus BUS1.

The binary elements 0–1 correspond to a code indicating the nature of the instruction; this code combined with binary elements 2–7 allocated particularly to the register 42 and the counter 35 then completely define the looping instruction. Binary elements 20–23 give the value of "i" and the binary elements 24–31 the value of "N". From this instruction format it follows that the parallel inputs of the register 42 are connected to the wires 20 to 23 corresponding to the binary elements 20–23 and those of the counter 35 to the wires 24–31.

The multiplexer 32 makes it possible to connect other registers to accommodate the address of a program code; this point will not be described in detail since it does not form part of the invention. A signal SCA applied to this multiplexer makes it possible to switch the register 30 to the program counter 5.

In order to facilitate the loop initialization operations and adapt to pipelining operation, steps have been taken to delay the execution of the loop after the loop instruction JB. To that end the loop circuit 20 incorporates a delay counter 50 intended to contain a number "D" corresponding to the number of instructions to be executed before beginning the loop (the instructions J01 to J0n in FIG. 2). Delay counter 50 delivers a signal ZDEL, corresponding to a zero therein, to trigger the start of execution of the loop. Like register 42 and loop counter 35, delay counter 50 is loaded with the loop instruction JB; the number "D" is defined by means of the binary elements 17 to 19. The wires corresponding to these binary elements are connected to the parallel inputs of delay counter 50. This counter advances in steps of "−1" in response to clock signals DDEL delivered by the loop control circuit 40.

An interesting feature of the invention is that a multiplexer 52 is incorporated which is controlled by a signal CMBR enabling the loop counter 35 to be loaded either from the bus BUS1 or from the data bus BUSD leaving the set of elements of the processor 4. This feature yields the advantage that the number "N" of executions may result from a calculation performed inside the set 4. The looping instruction JB may then have two forms (see FIG. 3): that at a, where the binary elements numbers 0, 1, 5, 6 and 7 have the values 1, 1, 1, 0 and 1, the register 42 and the counters 35 and 50 being loaded from the bus BUS1, that at b, where the binary elements numbers 0, 1, 2, 28, 29, 30 and 31 have the values 1, 0, 0, 0, 1, 1 and 0; only the counter 35 is loaded from the bus BUSD. These values are obviously given by way of example to clarify the subject.

The loop control circuit 40 is based on a decoder which can be embodied in the form of a PLA network, a PROM, etc. On the basis of the input signals ZCBI, ZCBR, ZDEL and HII, and also on the basis of the codes conveyed by the bus BUS1, this control circuit performs the following operations in which LCBI1, LCBR, LDEL, LCBI2 and LRAB are the commands for loading the registers and counters 42, 35, 50, 25 and 30 respectively, and SCA the control of the multiplexer 32:

$LCBI1 = I0.I1.\overline{I5}.\overline{I6}.I7.HII$ $LCBR = I0.I1.\overline{I5}.\overline{I6}.I7.HII + I0.\overline{I1}.\overline{I2}.\overline{I28}.I29.I30.\overline{I31}.HII$ $LDEL = I0.I1.I5.\overline{I6}.I7.HII$ $MBR = I0.\overline{I1}.\overline{I2}.\overline{I28}.I29.I30.\overline{I31}$ $LCBI2 = LCBI1 + ZCBI.\overline{HII}$ $DCBR = ZDEL.ZCB1.HII$ $LRAB = ZDEL$ $LCP = ZCB1$ $DCBI2 = ZDEL.HII$ $DDEL = \overline{ZDEL}.HII$ $SCA = ZDEL$ I0 and I1 indicate the value of the binary elements 0 and 1 as also do I5, I6 and I7 for the values of the elements 5, 6 and 7 of the bus BUS1.

Figure 4:
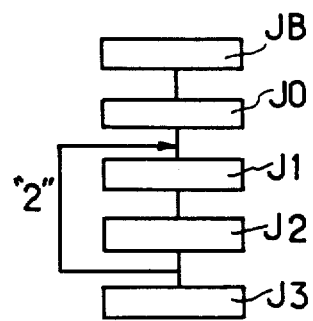
FIG. 4 shows a time diagram explaining the processor according to the invention.

Before explaining the operation of the loop circuit 20, it should be noted that the contents of the counters advance on the leading edges of the incrementation signals and that the parallel loading of these counters and of register 42 is effected at the "1" level of the counter loading signal. In order to facilitate this explanation, the particular case in which D=1, I=2 and N=2, which corresponds to the flow chart in FIG. 4, has been considered.

Figure 5:
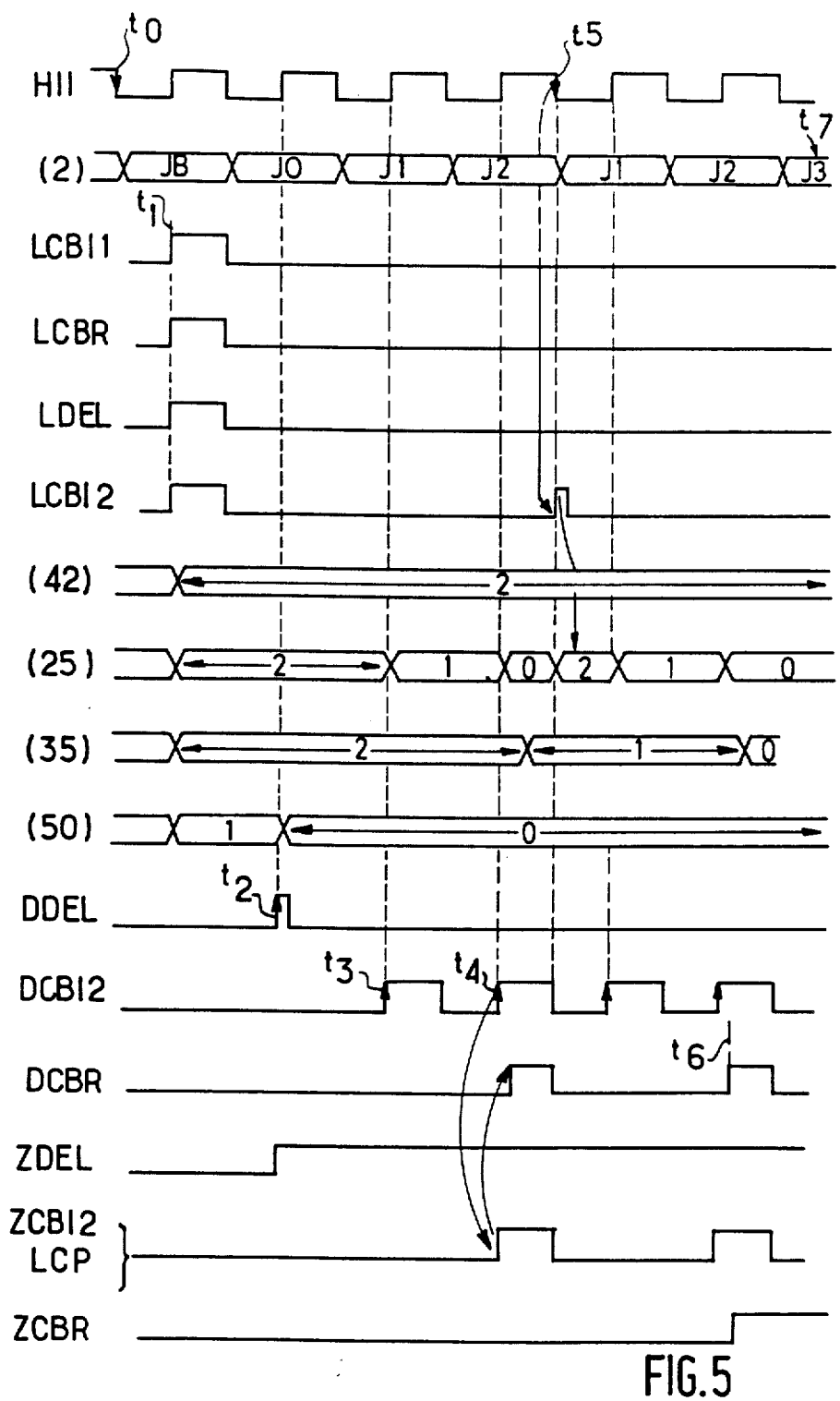
FIG. 5 shows a flow chart corresponding to the time diagram in FIG. 4.

Reference will now be made to FIG. 5. At the moment t0 a negative-going transition of signal HII (corresponding to a positive-going transition of the signal $\overline{HII}$) occurs; this transition causes the loading of instruction JB into instruction register 2. The fact that the binary elements 0, 1, 5, 6 and 7 are decoded means that the following relation has been effected: $I0.I1.I5.I6.I7 = 1$.

The signals LCBI1, LCBR and LDEL then become active at instant t1; the delay counter 50, the register 42 and the loop counter 35 are then respectively loaded with said D, i and N values, 1, 2 and 2. The fact that the signal LCBI1 is active implies that the signal LCBI2 is also active, which consequently causes loading of the counter 25. The contents of the counter 50 being different from zero, the signal ZDEL is consequently inactive, authorizing the application of the signal DDEL at instant t2 corresponding to the positive-going edge of the signal HII following instant t1. As the content of the counter 50 was "1" before instant t2, that content thus changes, at instant t1, to "0"; the signal ZDEL becomes active, which has two consequences:

the contents of the program counter 5 are stored in the register 30;

the progression signals DCI2 can be applied on the next positive-going edge of the signal HII.

The content of the instruction counter 25 assumes the value "0" shortly after the instant t4 corresponding to a positive-going edge of the signal HII and the signal ZCBI2 becomes active, resulting in the change to the active state of the signal DCBR and the loading of the program counter 5 with the instruction address code contained in the register 30. There now follows, at instant t5, the negative-going edge of the signal HII, causing the signal LCBI2 to change to the active state; consequently, the content of counter 25 again assumes the value "2", which causes the signal LCBI2 to change to the inactive state.

Events continue to take place in the manner indicated until the content of loop counter 35 assumes the value "0", triggered by the positive-going edge of the signal DCBR arising at instant t6, the signal ZCBR then becoming active. The signals LCBI2 and LCP are then locked in the inactive state so that the loop circuit is no longer operative. At instant t7 it is the next instruction J3 which therefore will be contained in the register 2.

What is claimed is:

1. A data processor for executing a program of instructions stored in a program memory and which are addressed by a program counter connected to the program memory, such processor including a loop circuit for controlling execution of a loop control instruction in said program calling for the execution N times of a loop sequence of "i" instructions, said loop circuit comprising a loop counter controlled by a repetition code in the loop control instruction to count the number of executions of said loop sequence and to deliver a loop completion signal when such count corresponds to said repetition code, such signal enabling the program counter to continue on to the remainder of the program; characterized in that said loop circuit further comprises:

- a loop sequence instruction counter of the sequential instructions in said loop and responsive to a loop length code in said loop control instruction to deliver an end-of-sequence signal upon each completion of said loop;
- a first register for loading the address of the initial instruction in said loop into said program counter and responsive to each of said end-of-sequence signals to again refresh said program counter with such initial loop instruction address; and
- a delay counter responsive to a delay code in said loop control instruction to count execution of a number "D" of succeeding instructions in said program after said loop control instruction before enabling said first register to load the address of said initial loop instruction into said program counter, delaying execution of the loop control instruction until completion of said number "D" of succeeding instructions in said program;

whereby execution of said loop control instruction is delayed so as to permit said data processor to initialize further registers therein for carrying out pipeline calculations in accordance with the instructions in said program loop.

2. A processor as claimed in claim 1, further comprising a second register which stores said number "i" of instructions in said loop and loads it into said instruction counter after each execution of said loop.

3. A processor as claimed in either of claims 1 or 2, further comprising a data bus line and an instruction bus line, and wherein said loop counter is selectably connected to said two bus lines by a selection means which is controlled by a selection instruction in said program.

4. A digital data processor comprising:

- a program memory for storing a program of instructions in a sequence of addresses therein, such program including a loop control instruction having therein (a) a delay code specifying an address distance between such loop control instruction and a subsequent instruction which is the first in a loop sequence of instructions, and (b) a repetition code specifying a required number of repetitions of said loop sequence;
- a program counter coupled to said program memory for addressing the stored instructions therein for readout at a predetermined counting rate;
- a delay counter coupled to said program memory and responsive to readout of said loop control instruction to count in synchronism with said program counter during a delay interval corresponding to the address distance specified by a delay code in said loop control instruction;
- first detection means coupled to said delay counter for detecting completion of the count thereof;
- a loop address register for storing therein the address of the initial instruction in said loop and controlled by said first detection means to supply such initial instruction address to said program counter at the end of said delay interval;
- second detection means coupled to said program counter for detecting when it reaches the address of the final instruction in said loop and thereupon supplying said program counter with the address stored in said loop address register of the initial instruction in said loop;
- loop execution counting means coupled to said program counter for counting each occurrence therein of the address of said initial loop instruction; and
- third detection means controlled by said loop execution counting means and responsive to said repetition code in said loop control instruction to disable said second detection means upon completion of said required number of repetitions of said loop, thereby causing said program counter to provide an address range for execution of said loop bounded by said initial loop instruction address and said final loop instruction address;

whereby execution of said loop control instruction is delayed so as to permit said data processor to initialize further registers therein for carrying out pipeline calculations in accordance with the instructions in said program loop.

5. A digital data processor as claimed in claim 4, wherein said third detection means is a loop repetition counter that is separate from said delay counter.

6. A digital data processor as claimed in claim 4, wherein said loop control instruction further has therein a loop length code specifying the number of instructions in said program loop, and further comprising a loop instruction counter for counting in synchronism with said program counter during execution of said loop; said loop instruction counter being coupled to said second detection means and being reset thereby upon each completion of the loop to a count corresponding to the initial instruction address in said loop.

7. A digital data processor as claimed in claim 6, wherein said loop instruction counter is separate from said delay counter.

* * * * *